US008969238B2

(12) United States Patent
Fehrmann et al.

(10) Patent No.: US 8,969,238 B2
(45) Date of Patent: Mar. 3, 2015

(54) NANOPARTICULAR METAL OXIDE/ANATASE CATALYSTS

(75) Inventors: Rasmus Fehrmann, Copenhagen (DK); Anders Riisager, Tanstrup (DK); Søren Birk Rasmussen, Madrid (ES); Steffen Buss Kristensen, Valby (DK); Andreas Jonas Kunov-Kruse, Copenhagen SV (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 960 days.

(21) Appl. No.: 13/129,522

(22) PCT Filed: Nov. 17, 2009

(86) PCT No.: PCT/EP2009/065300
§ 371 (c)(1),
(2), (4) Date: Aug. 31, 2011

(87) PCT Pub. No.: WO2010/055169
PCT Pub. Date: May 20, 2010

(65) Prior Publication Data
US 2012/0014854 A1 Jan. 19, 2012

Related U.S. Application Data

(60) Provisional application No. 61/115,245, filed on Nov. 17, 2008.

(30) Foreign Application Priority Data

Nov. 17, 2008 (EP) ..................................... 08169238

(51) Int. Cl.
*B01J 8/00* (2006.01)
*B01J 23/00* (2006.01)
(Continued)

(52) U.S. Cl.
CPC .............. *F01N 3/20* (2013.01); *B01D 53/8628* (2013.01); *B01D 53/8668* (2013.01);
(Continued)

(58) Field of Classification Search
USPC ......... 502/304, 305, 309, 312, 324, 326, 345, 502/350, 353; 423/239.1, 213.2
IPC ........ B01J 23/22,23/16, 23/54, 23/64, 23/6482, B01J 23/652, 21/00, 21/06, 21/063, 21/066; B01D 53/8628, 53/8625, 53/9418, 53/56
See application file for complete search history.

(56) References Cited

U.S. PATENT DOCUMENTS 3,279,884 A * 10/1966 Nonnenmacher et al. . 423/239.1
3,464,930 A * 9/1969 Goehre et al. ................ 502/309
(Continued)

FOREIGN PATENT DOCUMENTS

EP 2189217 A1 * 5/2010 ................ F01N 3/20

OTHER PUBLICATIONS

International Search Report issued for application No. PCT/EP2009/065300 on Apr. 13, 2010.
(Continued)

*Primary Examiner* — Patricia L Hailey
(74) *Attorney, Agent, or Firm* — Foley & Lardner LLP

(57) ABSTRACT

The present invention concerns a method of preparation of nanoparticular metal oxide catalysts having a narrow particle size distribution. In particular, the invention concerns preparation of nanoparticular metal oxide catalyst precursors comprising combustible crystallization seeds upon which the catalyst metal oxide is co-precipitated with the carrier metal oxide, which crystallization seeds are removed by combustion in a final calcining step. The present invention also concerns processes wherein the nanoparticular metal oxide catalysts of the invention are used, such as SCR (deNOx) reactions of nitrogen oxides with ammonia or urea as reductant, oxidations of alcohols or aldehydes with dioxygen or air to provide aldehydes, ketones or carboxylic acids, and photocatalytic oxidation of volatile organic compounds (VOCs).

17 Claims, 11 Drawing Sheets $NH_3$-Temperature Programmed Desorption profiles: a) baseline from 15 wt% $V_2O_5/SO_4^{2-}$-$TiO_2$, measured without saturation with $NH_3$, b) commercial reference, c) 15 wt% $V_2O_5$/$TiO_2$, d) 15 wt% $V_2O_5$-15 wt% $WO_3/SO_4^{2-}$-$TiO_2$, e) 15 wt% $V_2O_5/SO_4^{2-}$-$TiO_2$.

(51) Int. Cl.
| | |
|---|---|
| B01J 23/10 | (2006.01) |
| B01J 23/32 | (2006.01) |
| B01J 23/40 | (2006.01) |
| B01J 23/42 | (2006.01) |
| B01J 23/70 | (2006.01) |
| B01J 23/72 | (2006.01) |
| B01D 53/56 | (2006.01) |
| B01D 53/86 | (2006.01) |
| C01B 21/00 | (2006.01) |
| F01N 3/20 | (2006.01) |
| B01D 53/88 | (2006.01) |
| B01J 23/22 | (2006.01) |
| B01J 23/68 | (2006.01) |
| B01J 23/745 | (2006.01) |
| B01J 35/00 | (2006.01) |
| B01J 35/02 | (2006.01) |
| B01J 37/03 | (2006.01) |
| B01J 37/08 | (2006.01) |
| B82Y 30/00 | (2011.01) |
| B01J 21/06 | (2006.01) |

(52) U.S. Cl.
CPC .............. *B01D 53/885* (2013.01); *B01J 23/22* (2013.01); *B01J 23/682* (2013.01); *B01J 23/72* (2013.01); *B01J 23/745* (2013.01); *B01J 35/0013* (2013.01); *B01J 35/023* (2013.01); *B01J 37/033* (2013.01); *B01J 37/036* (2013.01); *B01J 37/08* (2013.01); *B82Y 30/00* (2013.01); *B01D 2251/2062* (2013.01); *B01D 2251/2067* (2013.01); *B01D 2255/1021* (2013.01); *B01D 2255/1023* (2013.01); *B01D 2255/206* (2013.01); *B01D 2255/20707* (2013.01); *B01D 2255/20715* (2013.01); *B01D 2255/20723* (2013.01); *B01D 2255/2073* (2013.01); *B01D 2255/20738* (2013.01); *B01D 2255/20761* (2013.01); *B01D 2255/20769* (2013.01); *B01D 2255/802* (2013.01); *B01D 2255/9202* (2013.01); *B01D 2255/9207* (2013.01); *B01D 2257/2064* (2013.01); *B01D 2257/7022* (2013.01); *B01D 2257/7027* (2013.01); *B01D 2257/704* (2013.01); *B01D 2257/708* (2013.01); *B01J 21/063* (2013.01); *B01J 21/066* (2013.01); *F01N 3/2066* (2013.01); *F01N 2510/0682* (2013.01)
USPC ............ 502/350; 502/304; 502/305; 502/309; 502/312; 502/324; 502/326; 502/345; 502/353; 423/213.2; 423/239.1

(56) References Cited

U.S. PATENT DOCUMENTS

| | | | | |
|---|---|---|---|---|
| 4,048,112 | A * | 9/1977 | Matsushita et al. | 502/350 |
| 4,085,193 | A * | 4/1978 | Nakajima et al. | 423/239.1 |
| 4,518,710 | A * | 5/1985 | Brennan | 502/309 |
| 4,742,037 | A * | 5/1988 | Baiker et al. | 502/247 |
| 5,840,971 | A * | 11/1998 | Gubelmann-Bonneau | 562/538 |
| 7,820,583 | B2 * | 10/2010 | Fu et al. | 502/209 |
| 7,842,641 | B2 * | 11/2010 | Fu et al. | 502/242 |
| 2008/0279740 | A1 * | 11/2008 | Augustine et al. | 423/239.1 |
| 2010/0266487 | A1 * | 10/2010 | Torardi | 423/612 |
| 2011/0027154 | A1 * | 2/2011 | Chapman | 423/213.2 |

OTHER PUBLICATIONS

Kang et al., "Methyl Orange Removal in a Liquid Photo-System with Nanometer Sized V/TiO$_2$ Particle," J. Ind. Eng. Chem., vol. 11, No. 2, pp. 240-247, 2005.

Bellifa et al., "Preparation and characterization of 20 wt.% V$_2$O$_5$-TiO$_2$ catalyst oxidation of cyclohexane," Applied Catalysis A: General, vol. 305, pp. 1-6, 2006.

Kumar et al., "An investigation of the thermal stability and performance of wet-incipient WO$_3$/V$_2$O$_5$/TiO$_2$ catalysts and a comparison with flame aerosol catalysts of similar composition for the gas-phase oxidation of methanol," Applied Catalysts B: Environmental, vol. 69, pp. 101-114, 2006.

Hari-Bala et al., "A novel approach to synthesis of high-dispersed anatase titania nanocrystals," Materials Letters, vol. 59, pp. 1937-1940, 2005.

Hari-Bala et al., "Controlling the particle size of nanocrystalline titania via a thermal dissociation of substrates with ammonium chloride," Materials Letters, vol. 60, pp. 494-498, 2006.

Kruse et al., "Seed-assisted sol-gel synthesis and characterization of nanoparticular V$_2$O$_5$/anatase," J. Mater. Sci., vol. 44, pp. 323-327, 2009.

Jorgensen et al., "Gas-Phase Oxidation of Aqueous Ethanol by Nanoparticle Vanadia/Anatase Catalysts," Topics in Catalysts, vol. 52, pp. 253-257, 2009.

* cited by examiner

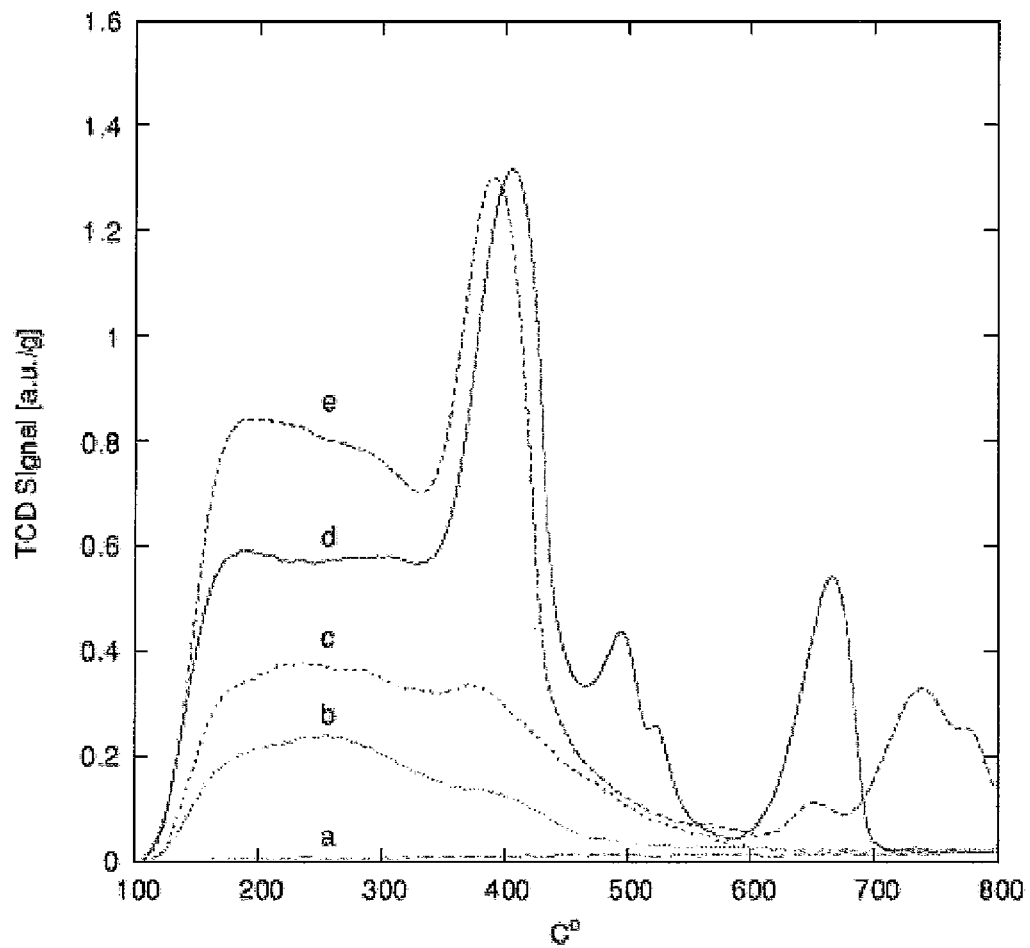
Figure 1. $NH_3$-Temperature Programmed Desorption profiles: a) baseline from 15 wt% $V_2O_5/SO_4^{2-}$-$TiO_2$, measured without saturation with $NH_3$, b) commercial reference, c) 15 wt% $V_2O_5/TiO_2$, d) 15 wt% $V_2O_5$-15 wt% $WO_3/SO_4^{2-}$-$TiO_2$, e) 15 wt% $V_2O_5/SO_4^{2-}$-$TiO_2$.

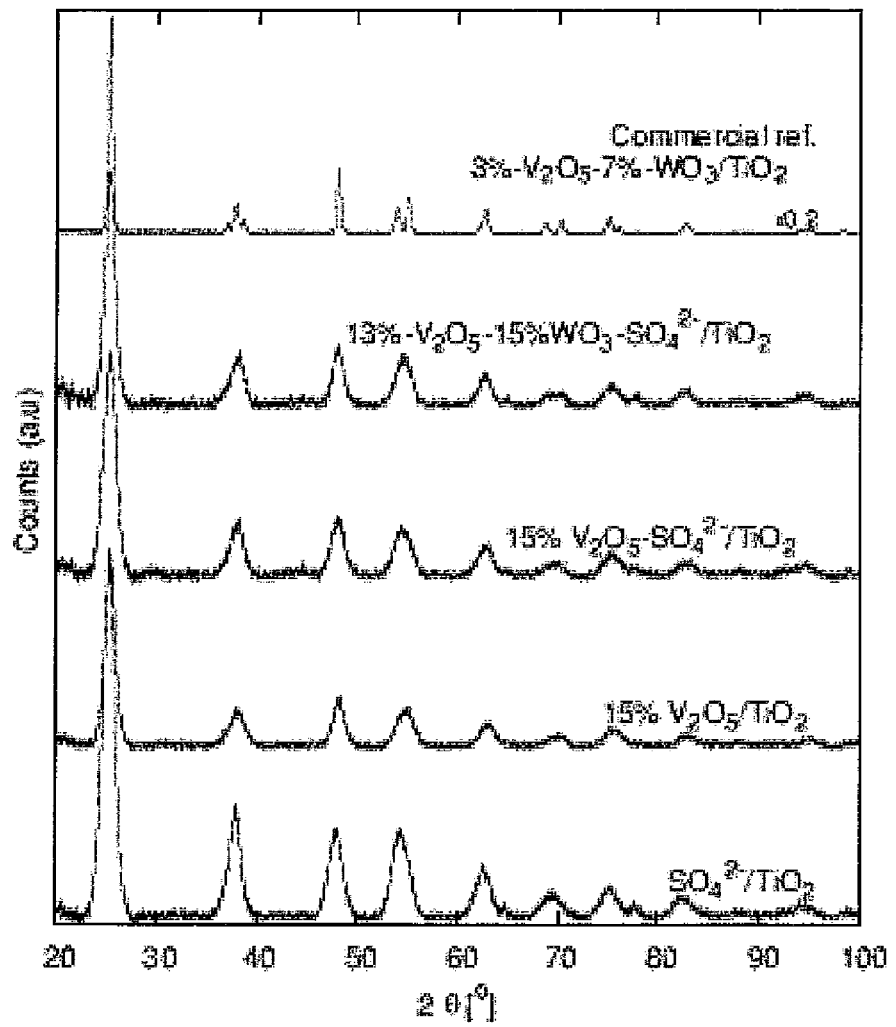
Figure 2: Selected powder diffractograms of prepared vanadia-titania catalysts. The intensity of the commercial reference catalyst has been scaled down 5 times.

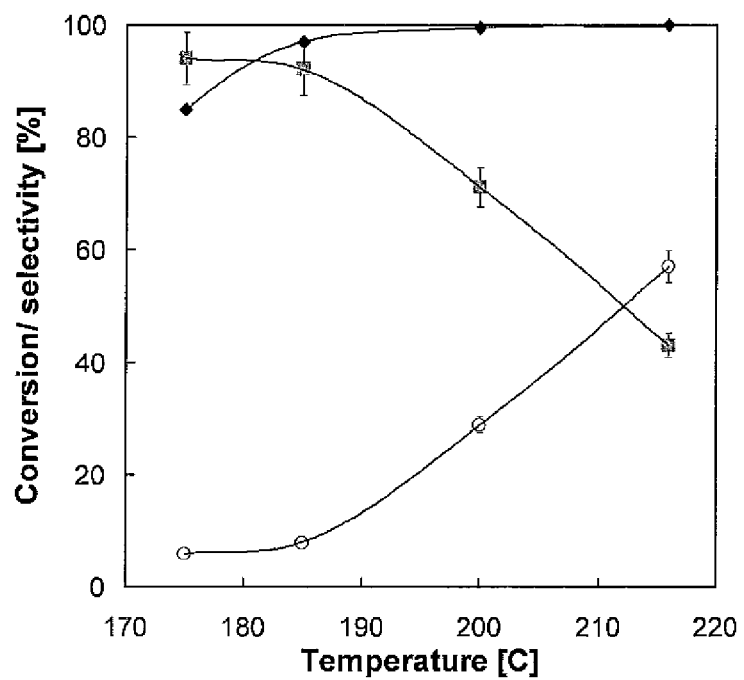
Figure 3: Ethanol conversion (♦) and selectivity towards acetaldehyde (■) and acetic acid (○) vs. reaction temperature ($P$ = 2.7 bar, GHSV = 25000 h$^{-1}$, O$_2$/ethanol mole ratio = 3.3).

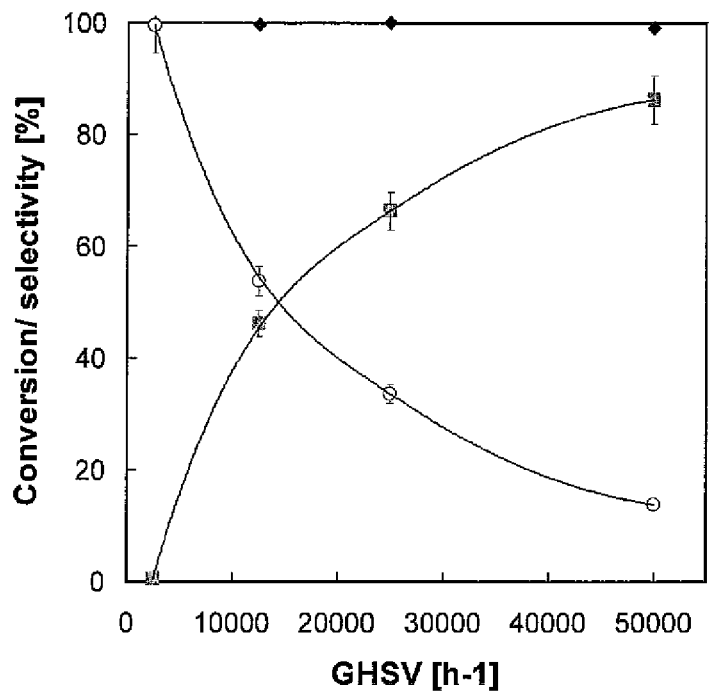
Figure 4: Ethanol conversion (♦) and selectivity towards acetaldehyde (■) and acetic acid (○) vs. gas hourly space velocity ($P$ = 2.7 bar, $T$ = 200 °C, $O_2$/ethanol mole ratio = 3.3).

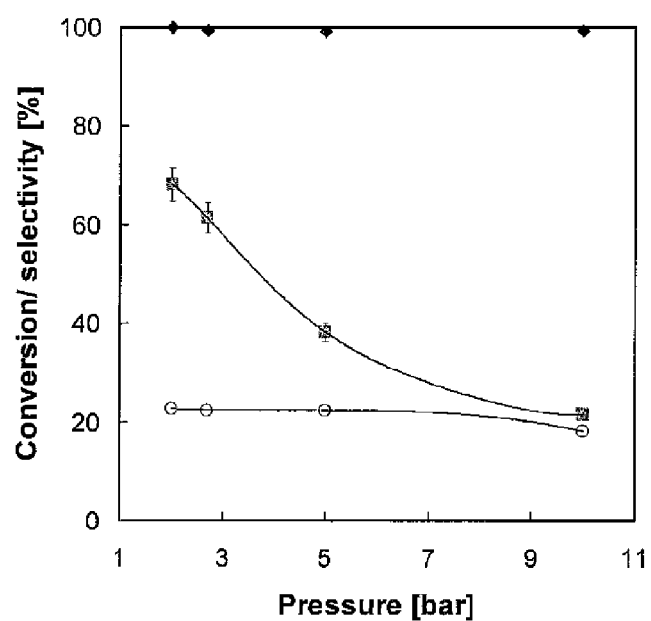
Figure 5: Ethanol conversion (♦) and selectivity towards acetaldehyde (■) and acetic acid (○) vs. reaction pressure ($T$ = 200 °C, GHSV = 25000 $h^{-1}$, $O_2$/ethanol mole ratio = 3.3).

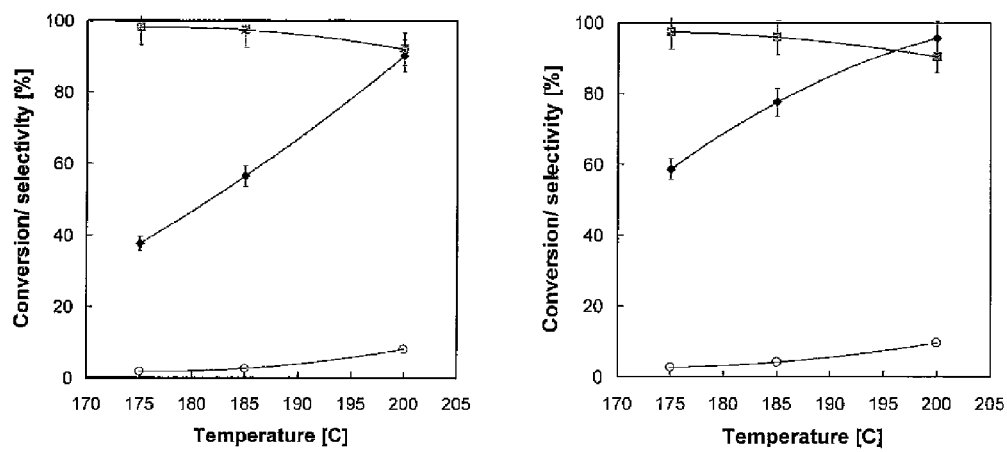
Figure 6: Ethanol conversion (♦) and selectivity towards acetaldehyde (■) and acetic acid (○) vs. reaction temperature for the 0.5 $O_2$/ethanol mole ratio series (left) and the 1.0 $O_2$/ethanol mole ratio series (right) ($P$ = 2.7 bar, GHSV = 25000 $h^{-1}$).

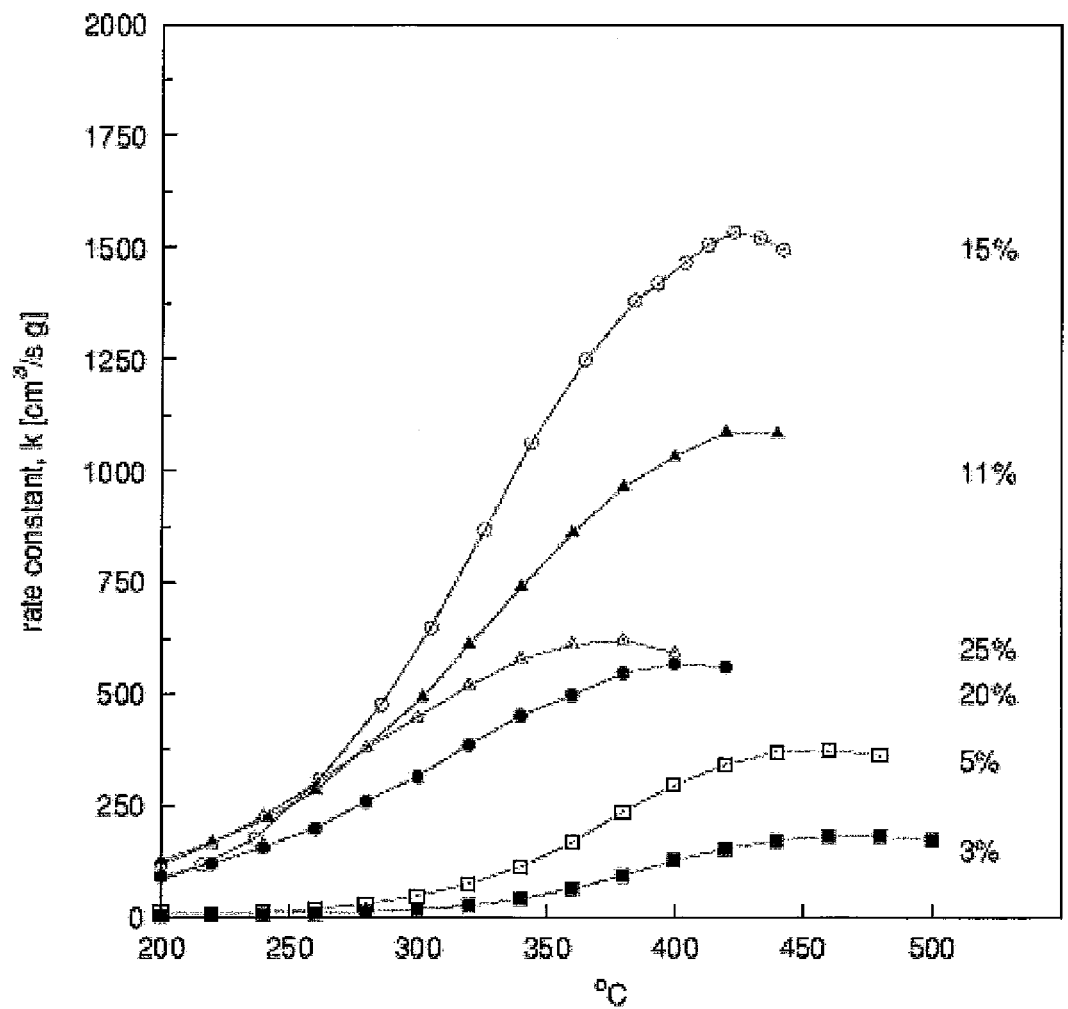
Figure 7. SCR activity of $V_2O_5/TiO_2$ catalysts with varying vanadia content. Catalysts were prepared with $NH_4Cl$ template.

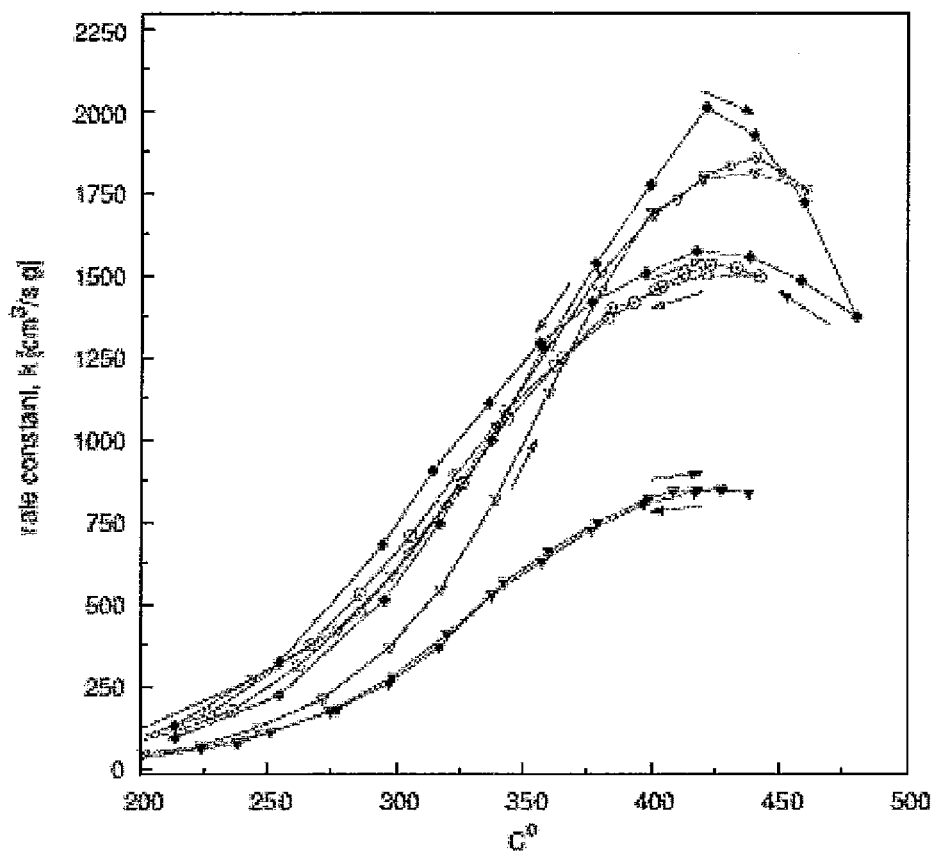

Figure 8. Activity by heating and cooling (indicated by arrows) of different synthesized catalysts: (O) unsulfated 15 wt% $V_2O_5/TiO_2$ catalyst synthesized with $NH_4Cl$, (♦) sulfated 15 wt% $V_2O_5/TiO_2$ catalyst synthesized with $NH_4NO_3$, (▽) sulfated 13 wt% $V_2O_5/TiO_2$ catalyst synthesized with $NH_4NO_3$ and impregnated with 15 wt% $WO_3$ and (▼) commercial state of the art 3 wt% $V_2O_5/TiO_2$ catalyst impregnated with 10 wt% $WO_3$.

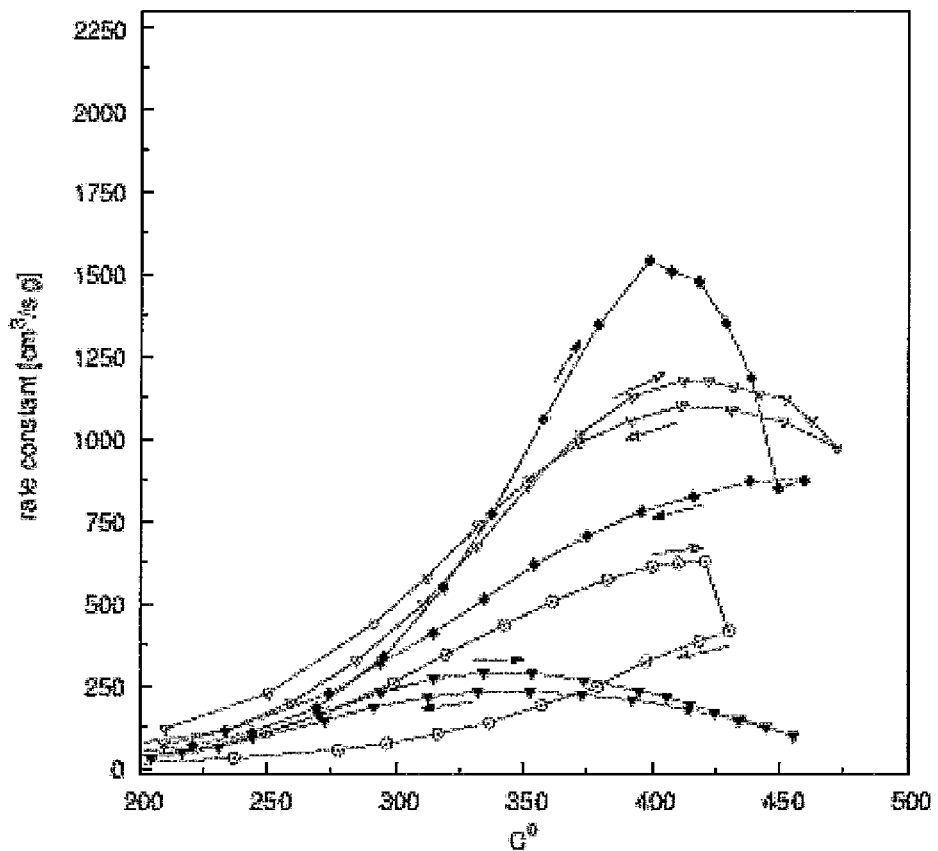

Figure 9. Activity by heating and cooling (indicated by arrows) of different synthesized catalysts doped with 0.01 g of potassium pr. g of catalyst: (O) unsulfated 15 wt% $V_2O_5/TiO_2$ catalyst synthesized with $NH_4Cl$, (♦) sulfated 15 wt% $V_2O_5/TiO_2$ catalyst synthesized with $NH_4NO_3$, (▽) sulfated 13 wt% $V_2O_5/TiO_2$ catalyst, synthesized with $NH_4NO_3$ and impregnated with 15 wt% $WO_3$ and (▼) commercial state of the art 3 wt% $V_2O_5/TiO_2$ catalyst impregnated with 10 wt% $WO_3$.

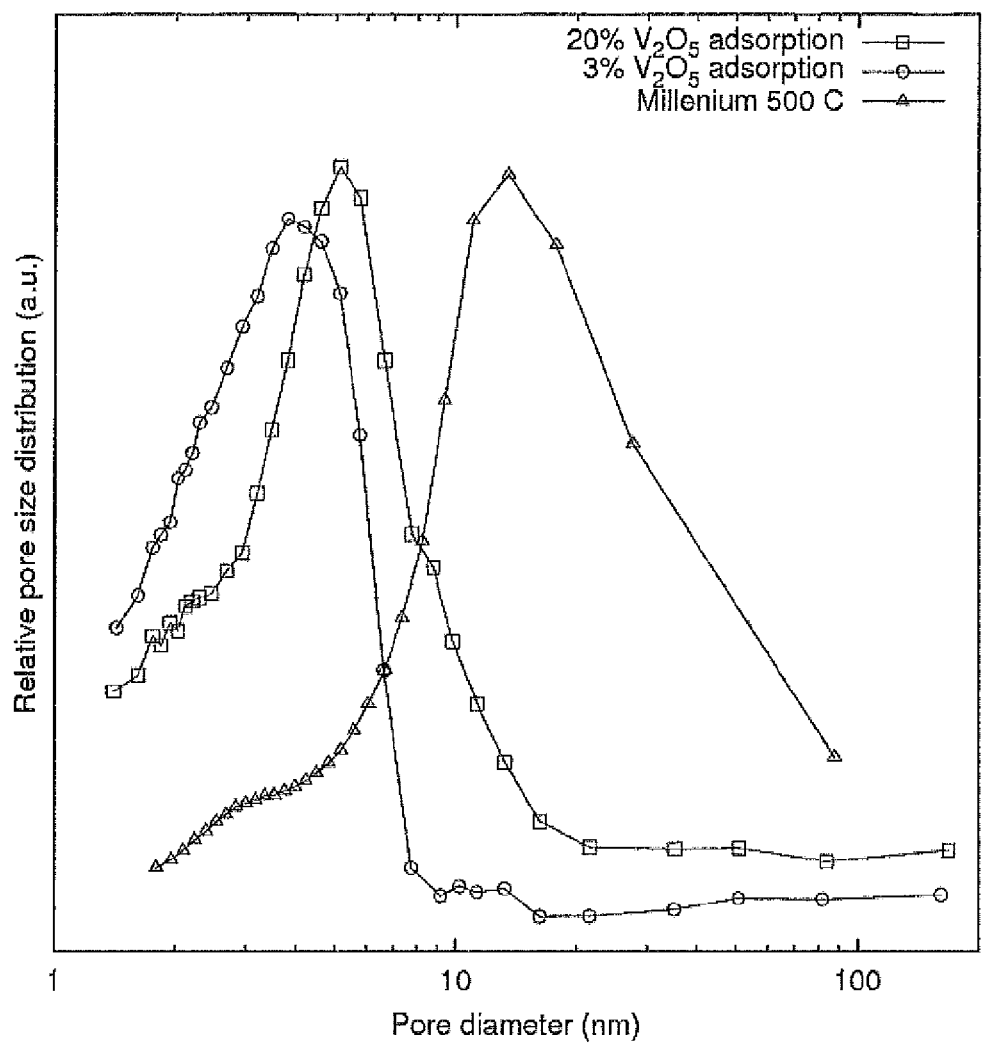
Figure 10: Pore size distributions obtained from nitrogen sorption data for 3 wt% and 20 wt% VO$_X$/anatase materials and a commercial pure anatase support (TIONA-G5, Millennium Co.), respectively.

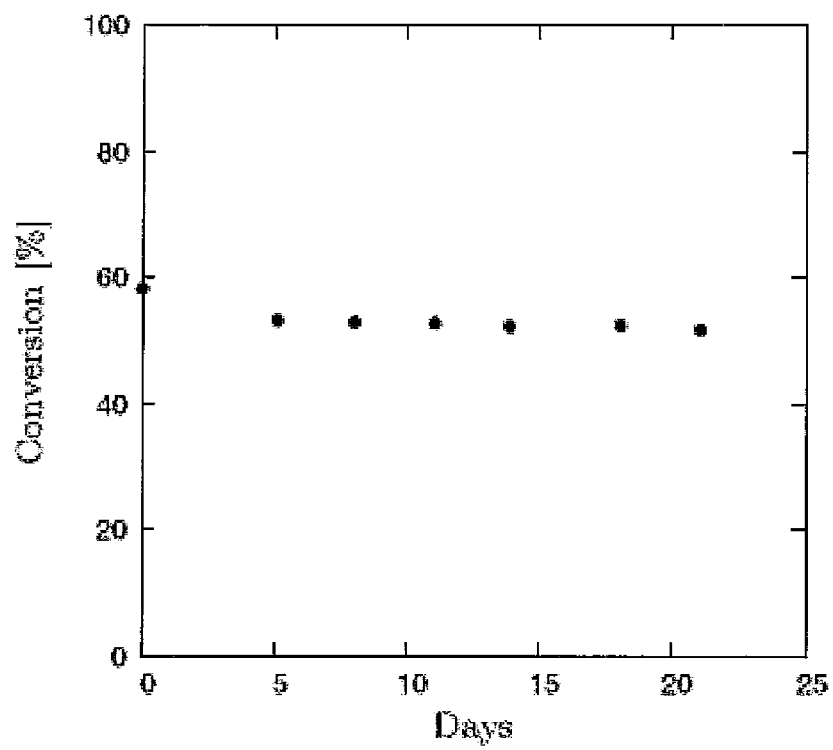

Figure 11: Long-term stability of 15 wt% $V_2O_5$/ $SO_4^{2-}$-$TiO_2$ deNOx catalyst.
Conditions: 3.1 mg catalyst (15 wt% $V_2O_5$/$SO_4^{2-}$-$TiO_2$) was subjected during three weeks to a constant flow (400 ml/min) of a gas mixture containing 1015 ppm $NH_3$, 935 ppm NO and 3.4% $O_2$ (He carrier gas) at 380° C. After an initial very small decrease, the activity of the catalyst was approximately constant when measured over the following three weeks.

NANOPARTICULAR METAL OXIDE/ANATASE CATALYSTS

FIELD OF THE INVENTION

The present invention concerns a method of preparation of nanoparticular metal oxide catalysts having a narrow particle size distribution, which catalysts comprise a carrier of a metal oxide and a substantially monolayered, catalytically active surface which are useful for the selective removal of nitrogen oxides from gases. In particular, the invention concerns preparation of nanoparticular metal oxide catalyst precursors comprising crystallization seeds upon which the catalyst metal oxide is co-precipitated with the carrier metal oxide, which crystallization seeds are removed by thermal decomposition in a final calcining step. The present invention also concerns nanoparticular vanadium oxide catalysts with catalyst loadings of up to 20% $V_2O_5$ by weight of the final catalyst. The present invention also concerns processes wherein the nanoparticular metal oxide catalysts of the invention are used, such as SCR (deNOx) reactions of nitrogen oxides with ammonia or urea as reductant, oxidations of alcohols or aldehydes with dioxygen or air to provide aldehydes, ketones or carboxylic acids, and photocatalytic oxidation of volatile organic compounds (VOCs).

BACKGROUND OF THE INVENTION

Vanadium oxides on inorganic support materials constitute the most important supported metal oxide catalysts in both heterogeneous and homogeneous industrial applications [Weckhuysen B M, Van Der Voort P, Catana G (eds) (2000) Spectroscopy of transition metal ions on surfaces. Leuven University Press, Leuven]. In these catalysts, the amount of active vanadium species exposed to the reactants vary with the type of support (typically $SiO_2$, $Al_2O_3$, $ZrO_2$, and $TiO_2$) and the loading of vanadium oxide on the carrier [Gao X, Wachs I E (2002) Top Catal 18:243]. Here both the surface area and the oxide type (i.e., textural and surface properties) dictate the maximum amount that can be loaded before surpassing the monolayer coverage leading to crystalline $V_2O_5$ formation [Weckhuysen B M, Keller D E (2003) Catal Today 78:25]. The preferred choice of support usually depends on the reactive environment of the catalyst during operation as well as the particular reaction in focus.

In the gas-phase oxidation of aqueous ethanol a $V_2O_5$ catalyst supported on $TiO_2$ and immobilized on clay was found to provide a very high selectivity of 97% towards acetic acid even at relatively moderate temperatures and pressures (180° C. and 1.7 bar) with the only byproduct being $CO_2$ [M. Gubelmann-Bonneau, US005840971 (1998) Rhodia S. A.]. This was an interesting finding, especially due to the growing interest worldwide in production and utilization of bioethanol. Bioethanol has found main usage as fuel or fuel additive in the transport sector, though at present it is impossible to produce enough bioethanol to replace gasoline. Moreover, it is required that all water, which typically accounts for up to 95 wt %, is removed from crude bioethanol prior to its use in combustion engines to reach satisfying fuel utilization. Initial flash distillation will generally provide a fraction with about 50 wt % water remaining, while further water removal is a very energy demanding and costly process. Alternatively it has therefore been suggested that ethanol is further converted into higher value-added chemicals via reactions that are not as sensitive to the water content [Rass-Hansen J et al., J. Chem. Technol. Biotechnol, 82 (2007) 329]. In this context an interesting possibility is to oxidize the ethanol whereby commodity acetyl derivatives such as, e.g. acetaldehyde, acetic acid and ethyl acetate can be formed. Of these possibilities only the formation of acetic acid has been demonstrated under commercially interesting conditions, and there is consequently a need for a relatively cheap and robust catalyst that may effect the conversion of aqueous ethanol such as bioethanol from fermentation to other industrially applicable derivatives such as acetaldehyde.

$V_2O_5$ catalysts supported on $TiO_2$ are not only interesting in relation to oxidation processes. It is also well known that $TiO_2$, especially in the anatase form, is an excellent support for vanadium oxides making highly active materials for the selective catalytic reduction (SCR) of nitrogen oxides (i.e. deNOx) by injection of ammonia in power plant flue-gases and other industrial off-gases [Parvulescu V I, Grange P, Delmon B (1998) Catal Today 46:233]. However, the activity of the industrial $VOx/TiO_2$-based SCR catalyst is limited by the surface area of the anatase carrier, since only up to one monolayer of the vanadium oxide species can be accepted corresponding to a vanadia loading of 3-5 wt. %. Increased loading results in decreased deNOx activity and increased ability to oxidize $NH_3$ and possibly also $SO_2$ in the flue gas [Busca G et al. (1998) Appl Catal 18:1].

Kang M et al. in "Methyl orange removal in a liquid photo-system with nanometer sized $V/TiO_2$ particle", Journal of Industrial And Engineering Chemistry, vol. 11, no. 2, pages 240-247 discloses a nanometer-sized $V/TiO_2$ photocatalyst synthesized by a commercial sol-gel method for the removal of methyl orange. However, the catalyst composition is mixed anatase/rutile which has inferior catalytic properties. Furthermore the BET surface area is low, ≤15 $m^2/g$. The crystal size of the material is large (20-70 nm) and increases with increasing content of vanadium pentoxide. Crystalline vanadium pentoxide is observed in the material of Kang at a concentration of 10% w/w, possibly even at lower concentrations. Kang's material is not obtained using the seed/template technique, and the application in SCR $deNO_x$ reactions is not mentioned, nor is the SCR activity measured.

Bellifa A et al. in "Preparation And Characterization Of 20 wt. % $V_2O_5$—$TiO_2$ Catalyst Oxidation Of Cyclohexane", Applied Catalysis A: General, Elsevier Science, Amsterdam Vol. 305, No. 1, (2006) Pages 1-6 discloses the preparation of a $V_2O_5$—$TiO_2$ catalyst for the oxidation of cyclohexane. The catalyst is prepared by an acid-catalyzed sol-gel process (not using the seed/template technique), and exhibited a high oxidation activity and selectivity for the conversion of cyclohexane into cyclohexanol. The images obtained by TEM (transition electron microscopy) show nanoparticles in the range from around 20-300 nm.

However, just like Kang's catalyst, Bellifa's catalyst composition is mixed anatase/rutile which has inferior catalytic properties and a low BET surface area, 27 $m^2/g$. It further contains large particles with a small fraction of nanocrystals app 5 nm and displays a very broad particle size distribution. Finally, the material of Bellifa et al. is calcined at a relatively low temperature (300° C.) which is expected to lead to structural changes of the catalyst particles caused by sintering when used for deNOx purposes, i.e. typically at 350-400° C. Bellifa's catalyst is therefore not suited for application in SCR $deNO_x$ reactions and the SCR activity is not measured.

Kumar V et al. in "An investigation of the thermal stability and performance of wet-incipient $WO_3/V_2O_5/TiO_2$ catalysts and a comparison with flame aerosol catalysts of similar composition for the gas-phase oxidation of methanol" Applied Catalysis B: Environmental, Elsevier, Vol. 69, No. 1-2, 2006 Pages 101-114, discloses $WO_3/V_2O_5/TiO_2$ catalysts which are prepared by incipient wetness impregnation and flame aerosol method. The catalyst prepared by flame aerosol method exhibits particles sizes between 28-45 nm and showed good catalytic performances in the oxidation of ethanol. However, like Bellifa's catalyst Kumars material displays a rather low BET surface area, 90 m$^2$/g, and consists of crystals having different sizes up to 30 nm which renders the performance unpredictable, and most importantly, the high-surface area anatase particles of Kumar's material is not stabilized, which leads to a drastic decrease (about 70%) of the surface area when the material is impregnated, even at low $V_2O_5$ concentrations. Again no measurements of NOx SCR activity are reported.

A further interesting application of $V_2O_5$ catalysts supported on $TiO_2$ is in the areas of catalytic combustion of volatile organic compounds (VOCs) [Everaert K et al., Journal of Hazardous Materials B109 (2004) 113-139] and especially in the photocatalytic degradation of VOCs [Tanizaki T et al., Journal of Health Science, 53(5) 514-519 (2007)].

In the atmosphere, especially in indoor air, there are many kinds of volatile organic compounds (VOCs) which lead to water and air pollution, and even to indoor air pollution. Though their concentrations are generally at low ppb levels, some of them have a harmful influence on the living environment: for example, the odorous substances which are generated by the biological activity of human beings and other animals; the "sick building" chemicals vaporized from paint, and bonds used as building materials.

A promising approach for remediating VOC is to employ photocatalytic reactors that oxidize these compounds. Semiconducting materials contain electrons that are confined to relatively narrow energy bands. The band of highest energy that contains electrons is the valence band, while the band lying above the valence band, i.e. the conduction band, has very few electrons. The difference in energies between the highest energy of the valence band and the lowest energy of the conduction band is termed the band gap energy.

When a semiconductor absorbs a photon of energy equal to or greater than its band gap, an electron may be promoted from the valence band to the conduction band leaving behind an electron vacancy or "hole" in the valence band. If charge separation is maintained, the electron and the hole may migrate to the catalyst surface where they participate in redox reaction with sorbed species (Burns R. A. et al. (1999) Journal of Environmental Engineering, January, 77-85).

Photocatalytic oxidation of VOCs is a cost-effective technology for removal of VOCs compared with adsorption, biofiltration, or thermal catalysis. The most commonly used catalyst in this application is titanium dioxide (titania) because of its stability under most reaction conditions, and because $TiO_2$ is an inexpensive, non-toxic and biocompatible material. Numerous studies have indicated that illuminating the anatase form of $TiO_2$ with near UV radiation has been successful in eliminating organic compounds such as methanol, acetone, methyl ethyl ketone, isopropanol, chloroform and trichloroethylene (Alberici R. M. et al. (1997) Appl Catal Environmental, vol 14, 55-68; Dibble L. A. et al. Environmental Science and Technologies, vol 26, 492-495).

For the possible destruction of VOCs at room temperature, consideration has also been given to the photocatalytic oxidation of gaseous phase organic compounds, using $TiO_2$-based catalysts coupled with other catalytically active materials. For example, has the photocatalytic oxidation of acetone with a pure $TiO_2$ catalyst or a mixed $TiO_2/ZrO_2$ catalyst at 77° C., prepared in thin layer form using a sol-gel method, been described (Zorn M E et al (1999) Appl Catal B: Environmental, vol. 23, p. 1-8). Photocatalysts of $Pt/TiO_2$ types have been used to decompose ethanol at a temperature in the region of 200° C. (Kennedy J C. et al. Journal of Catalysis, vol. 179, p. 375-389 (1998). A mixed photocatalyst of $CdS/TiO_2$ type was tested for the decomposition of phenol, 2-chlorophenol and pentachlorophenol in the liquid phase (Serpone N et al. (1995) Journal of Photochemistry and Photobiology A: Chemistry, vol. 85, p. 247-255).

There is consequently a need for a relatively cheap and robust method of preparation, whereby high loadings of different catalytically active species on metal oxide carriers can be achieved without sacrificing catalytic selectivity.

SUMMARY OF THE INVENTION

It has now surprisingly been found that nano-sized particular (nanoparticular) vanadium oxide/anatase $TiO_2$ catalysts with vanadia loadings up to 20 wt. % of the total catalyst mass having an average particle size down to 6 nm±2 nm with a narrow size distribution, and a relatively high-surface area (up to app. 250 m$^2$/g) can be synthesized by a seed-assisted, sol-gel, co-precipitation procedure involving concomitant hydrolysis of titanium(IV) and vanadium (V) alkoxides in the presence of ammonium salt seed crystals, followed by a standard calcination procedure which decompose the ammonium salt template and convert the amorphous titania carrier into crystalline anatase. The small particle size of the anatase support (due to the corresponding high surface area) allowed high loading of at least up to 15 wt % vanadia without exceeding monolayer coverage of $V_2O_5$ in contrast to typical industrial catalysts which only can accommodate 3-5 wt %.

This procedure has been found to be general in nature and also applies to other carrier metal oxides such as the oxides of titanium, zirconium, cerium, tungsten, silicon and aluminum, or mixtures thereof, and to other catalytically active materials such as the oxides of vanadium, iron, copper, platinum, palladium, chromium and manganese, or mixtures thereof. Other hydrolysable metal oxide precursors may be employed, as may other seed crystal precursors.

In a first aspect the invention therefore concerns a method of preparation of nanoparticular metal oxide catalysts, which catalysts comprise a carrier metal oxide and a catalytically active component, comprising the following steps:

a) providing a solution of a crystallization seed precursor in a first solvent;

b) providing a solution of one or more hydrolysable carrier metal oxide precursors and one or more hydrolysable catalyst precursors in a second solvent;

c) combining the solutions of step a) and b) under acidic, aqueous conditions, thereby hydrolyzing said metal oxide and catalyst precursors;

d) aging the reaction mixture of step c) thereby allowing the hydrolytic processes to proceed substantially to completion, thereby providing nanoparticular metal oxide catalyst precursors comprising crystallization seeds upon which the catalyst metal oxide is co-precipitated with the carrier metal oxide; and e) finishing said precursors to provide nanoparticular metal oxide catalysts.

In a second aspect the invention concerns a method of preparation according to the first aspect, wherein said aging and finishing steps d) and e) comprise one or more of the following operations f)-h):

f) Allowing the aging of said nanoparticular metal oxide catalyst precursors to proceed for between 4 and 48 hours;

g) adding an effective amount of a strong acid, such as 0.05-1 mole protons per mole metal oxide, preferably 0.2-0.5 mole protons per mole metal oxide h) removing solvents and volatile reaction components by evaporation in vacuo;

followed by calcining the nanoparticular metal oxide catalyst precursors for between 2 and 8 hours at between 250° C. and 500° C.

Another aspect of the invention concerns nanoparticular metal oxide catalysts, which catalysts comprise a carrier metal oxide comprising a catalytically active surface, obtainable by a process as described in the second aspect of the present invention.

Another aspect of the invention relates to the use of a nanoparticular metal oxide catalyst of the invention as selective catalytic reduction (SCR) deNO$_x$ catalysts for environmental processes involving elimination of nitrogen oxides from e.g. power plant flue gases or other off-gases containing nitrogen oxides (NO$_X$ such as N$_2$O, NO, NO$_2$) by use of a reductant (alkanes, alkenes, alcohols, ammonia or ammonia derivatives such as e.g. urea) which over the catalyst is selectively oxidized by NO$_X$.

Another aspect of the invention relates to the use of a nanoparticular metal oxide catalyst of the invention as oxidation catalysts for the preparation of carboxylic acids, aldehydes or ketones, and mixtures thereof, from neat alcohol or aqueous alcohol solutions in continuous, gas-phase flow reaction mode by employing dioxygen or air as the oxidizing agent.

Another aspect of the invention relates to the use of a nanoparticular metal oxide catalyst of the invention as catalysts for photocatalytic degradation of volatile organic compounds (VOC's) such as, but not limited to, phenol, toluene, xylenes, n-hexane, formaldehyde, methanol, ethanol, isopropanol, acetone, methyl ethyl ketone, chloroform, trichloroethylene and mixtures thereof.

Another aspect of the invention relates to a process for removing nitrogen oxides in the presence of ammonia or urea as reductant from flue gases or other industrial off-gases, which process comprises using a catalyst of the invention at ambient pressure and at temperatures of 100° C. to 500° C. with a stoichiometric or excess amount of the reductant.

Another aspect of the invention relates to a process for the manufacture of C$_1$-C$_6$ carboxylic acids, aldehydes or ketones or mixtures thereof from 1 to 75 wt % aqueous alcohol solutions which process comprises using a catalyst of the invention at pressures from 1 to 20 bars and at temperatures of 100 to 250° C. with an amount of oxidizing agent corresponding to an O$_2$/alcohol molar ratio of between 0.5 to 10.

FIGURES

FIG. 1: NH$_3$-Temperature Programmed Desorption profiles of a commercial catalyst vs. sulphated and non-sulfated catalysts of the invention FIG. 2: Selected powder diffractograms of prepared vanadia-titania catalysts.

FIG. 3: Ethanol conversion and selectivity towards acetaldehyde and acetic acid vs. reaction temperature.

FIG. 4: Ethanol conversion and selectivity towards acetaldehyde and acetic acid vs. gas hourly space velocity.

FIG. 5: Ethanol conversion and selectivity towards acetaldehyde and acetic acid vs. reaction pressure.

FIG. 6: Ethanol conversion and selectivity towards acetaldehyde and acetic acid vs. reaction temperature for the 0.5 O$_2$/ethanol mole ratio series (left) and the 1.0 O$_2$/ethanol mole ratio series (right).

FIG. 7: SCR activity of V$_2$O$_5$/TiO$_2$ catalysts with varying vanadia content. Catalysts were prepared with NH$_4$Cl template.

FIG. 8: Activity by heating and cooling (indicated by arrows) of different synthesized catalysts.

FIG. 9: Activity by heating and cooling (indicated by arrows) of different synthesized catalysts doped with 0.01 g of potassium pr. g of catalyst.

FIG. 10: Pore size distributions obtained from nitrogen sorption data for 3 wt % and 20 wt % VO$_X$/anatase materials and a commercial pure anatase support (TIONA-G5, Millennium Co.), respectively.

FIG. 11: Long-term stability of 15 wt % V$_2$O$_5$, SO$_4^{2-}$—TiO$_2$ deNOx catalyst.

DETAILED DESCRIPTION OF THE INVENTION

In a first aspect the invention concerns a method of preparation of nanoparticular metal oxide catalysts, which catalysts comprise a carrier metal oxide and a catalytically active component, comprising the following steps:

a) providing a solution of a crystallization seed precursor in a first solvent;

b) providing a solution of one or more hydrolysable carrier metal oxide precursors and one or more hydrolysable catalyst precursors in a second solvent;

c) combining the solutions of step a) and b) under acidic, aqueous conditions, thereby hydrolyzing said metal oxide and catalyst precursors;

d) aging the reaction mixture of step c) thereby allowing the hydrolytic processes to proceed substantially to completion, thereby providing nanoparticular metal oxide catalyst precursors comprising crystallization seeds upon which the catalyst metal oxide is co-precipitated with the carrier metal oxide; and e) finishing said precursors to provide nanoparticular metal oxide catalysts.

In a second aspect the invention concerns a method of preparation according to the first aspect, wherein said aging and finishing steps d) and e) comprise one or more of the following operations f)-h):

f) Allowing the aging of said nanoparticular metal oxide catalyst precursors to proceed for between 4 and 48 hours;

g) adding an effective amount of a strong acid, such as 0.05-1 mole protons per mole metal oxide, preferably 0.2-0.5 mole protons per mole metal oxide h) removing solvents and volatile reaction components by evaporation in vacuo;

followed by calcining the nanoparticular metal oxide catalyst precursors for between 2 and 8 hours at between 250° C. and 500° C.

In a particular embodiment the aging period is 48 hours. In another embodiment the calcination is carried out for between 4 and 6 hours at between 360° C. and 420° C. In another embodiment the calcination is carried out for 4 hours at 380° C.

In an embodiment the strong acid is selected from hydrochloric acid, nitric acid, sulphuric acid, methanesulphonic acid or trifluoromethanesuiphonic acid. The addition of a strong acid to the gel is important for certain embodiments of the present invention, in particular when it is desired to remove acetic acid before calcination. A significant amount of the acetic acid will coordinate strongly to the metal centers on the surface of the formed metal oxide particles as acetate ions. The acetate ions on the surface have shown very difficult to remove from the surface in the absence of the strong acid, even after 100 hours of vacuum treatment at 50° C. (This has been confirmed by IR measurements (CH$_3$ rocking 1030 cm$^{-1}$). The addition of a strong acid will transform the coordinated acetate ions to free acetic acid which is easier to evaporate. The strong acid further catalyzes the formation of esters which are easily removed from the system just by evaporation at reduced pressures. If not removed from the gel, the acetic acid will damage the catalyst during calcination and a significant drop in catalytic activity is observed. For the application of the invention as SCR deNOx catalysts, sulfuric acid is particularly well-suited as the chosen strong acid due to the promoting effect of sulfate ions which are bound to the nanoparticles after the addition of sulfuric acid. Sulfates are widely known to increase the surface acidity of metal oxides, which is wanted for this type of catalysts. Furthermore, the sulfate stabilizes the metal oxide nanoparticles and thereby increases the surface area significant.

This was demonstrated by temperature programmed desorption experiments where a commercial reference catalyst was compared with sulfated and non-sulfated catalysts of the present invention.

$NH_3$-TPD profiles of representative catalysts are shown in FIG. 1 and the calculated corresponding total adsorbed ammonia and specific acidity in Table 1.

For the unsulfated catalyst the specific acidity was, as expected, very similar to the commercial reference catalyst, although the strength of the acidic sites in the commercial catalyst seemed to be slightly weaker. The total amount of acidic sites in all the nanoparticle catalysts was higher due to the higher surface areas.

TABLE 1

Ammonia TPD of the catalysts.

| Catalyst | Desorbed ammonia[a] (cm³/g) | Specific acidity[a] ($NH_3$/nm²) |
|---|---|---|
| 15 wt % $V_2O_5/TiO_2$ | 22 | 4.3 |
| 15 wt % $V_2O_5/SO_4^{2-}$—$TiO_2$ | 71 | 11.9 |
| 15 wt % $V_2O_5$-15 wt % $WO_3/SO_4^{2-}$—$TiO_2$ | 56 | 8.8 |
| 3 wt % ref. | 12 | 4.5 |

[a]The acidity was calculated only on basis of acidic sites with intermediate strength (<600° C.) since higher and superacidic sites are not likely to take part in the SCR-reaction.

By sulfation of the carrier a significant increase in the amount of acidic sites of varying strength was observed corresponding to a total acidity up to three times that of the unsulfated samples. A background was performed to exclude decomposition products originating from adsorbed sulfate. A peak around 380° C. in the TPD profile indicated that the sulfation of the carrier induced sites with relatively high strengths. These stronger sites are expected to be crucial to the SCR activity of the catalysts, as weaker acidic sites will be unable so adsorb ammonia at the typical operating temperatures around 350-400° C.

The introduction of $WO_3$ decreased the total amount of acidity slightly, although a new type of extremely acidic sites was generated (see FIG. 1). This is possibly because the surface area available for binding sulfates was reduced by the presence of the $WO_3$. A small part of the acidic sites generated on both sulfated catalysts seem too be very strong with peak values as high as 500, 670 and 740° C. These sites are likely to adsorb ammonia too strongly to be active in the SCR reaction and were therefore excluded in the calculation in Table 1. However, they may still be able to host alkali and thereby enhance the activity in case of alkali poisoning.

In a preferred embodiment of the invention the strong acid is therefore sulphuric acid. In another embodiment the strong acid is hydrochloric acid. In another embodiment the strong acid is nitric acid. In another embodiment the strong acid is methanesulphonic acid. In another embodiment the strong acid is trifluoromethanesulphonic acid.

In a specific embodiment the strong acid is employed in an amount of 0.05-1 mole protons per mole metal oxide, preferably 0.2-0.5 mole protons per mole metal oxide.

In a particular embodiment of the invention the first solvent comprises water, such as water with or without an added polar, water-miscible solvent, such as, for example, $C_1$-$C_4$ alcohols such as methanol, ethanol, 1-propanol, 2-propanol; cyclic ethers such as tetrahydrofuran and 1,4-dioxane; acetonitrile, nitromethane and mixtures thereof, optionally comprising water.

In another embodiment of the invention the second solvent is a polar, water-miscible organic solvent selected from $C_1$-$C_4$ alcohols such as methanol, ethanol, 1-propanol, 2-propanol, 1-butanol, 2-butanol, 2-methyl-1-propanol, 2-methyl-2-propanol; cyclic ethers such as tetrahydrofuran and 1,4-dioxane; dialkylketones such as acetone, methylethylketone and methylisobutylketone; alkylnitriles such as acetonitrile and propionitrile; nitromethane, and mixtures thereof, optionally comprising water.

In a further embodiment of the invention the crystallization seed precursor is an ammonium salt:

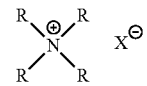

wherein each R group is individually selected from hydrogen, $C_1$-$C_{12}$ alkyl and phenyl-$C_1$-$C_6$ alkyl including alcohol-, ether-, ester-, amine-, amide-, cyano-, and halogen-functionalized alkyl chains, such that all four R groups are identical or three R groups are identical or two R groups are identical or all four R groups are different; and wherein $X^-$ is a negatively charged ion such as a $C_1$-$C_4$ carboxylate, such as acetate or propanoate, a halide such as chloride or bromide or an oxyanion, such as carbonate, hydrogen carbonate, carbamate, sulfamate, nitrate or sulfate.

In a specific embodiment of the invention the crystallization seed precursor is combustible, i.e. it is thermally decomposed during the calcination step. This was demonstrated by XRPD analysis of vanadia-titania catalysts using either $NH_4Cl$ or $NH_4NO_3$ as crystallization seed which revealed only crystalline anatase as support phase with no peaks originating from residual crystalline $NH_4Cl$, $NH_4NO_3$ or $V_2O_5$. Catalysts with amounts of vanadia surpassing the monolayer limit of 8 V atoms pr. nm² showed likewise no crystalline $V_2O_5$, indicating a high dispersion of an amorphous vanadia phase as typically found for oxide supported vanadia catalysts. However, the samples originating from $NH_4Cl$ seeds did show a new phase originating from either a crystalline vanadia-titania phase or a vanadia-chloride phase. Both could be formed during the gelling and calcination either as a reaction between the $NH_4Cl$ template and the vanadium precursor or by crystal rearrangement during the calcination. The vanadia-titania catalysts prepared using $NH_4NO_3$ as crystallization germ did not show this unknown phase (see FIG. 2) supporting the vanadia-chloride phase hypothesis.

The size of the formed oxide crystallites was calculated by Scherrer's equation (using the peak at angle 2θ=25.3° to be in the range 6-18 nm, see Table 2, with no obvious correlation to the vanadia content. However, the crystallite size was very dependent on the applied crystallization germ; catalysts synthesized using $NH_4Cl$ resulted in formation of much larger crystals (11-18 nm) compared to catalysts synthesized using NH$_4$NO$_3$, which yielded anatase crystals with sizes around 6-8 nm. Including sulfation of catalysts as a last step in the preparation procedure before drying further decreased the crystallite size, as shown in Table 2. Sequential measurements of the samples during calcination revealed that anatase crystallization was initiated around 300° C. followed by crystal growth until the particles reached the reported equilibrium size after 4 h.

TABLE 2

Characteristics of the prepared vanadia-anatase catalysts

| wt % V$_2$O$_5$ | $k_{max}(T_{max}/° C.)$ (cm$^3$/g s) | $E_a$ (kJ/mol) | $S_{BET}$ (m$^2$/g) | $d_{particle}$[a] (nm) | $n_s$[b] (V/nm$^2$) |
|---|---|---|---|---|---|
| 0[c]  | 24(520)    | 63.0 | 73  | 15.0 | —    |
| 3[c]  | 182(480)   | 61.1 | 109 | 14.4 | 1.8  |
| 5[c]  | 375(460)   | 59.2 | 64  | 15.8 | 5.4  |
| 11[c] | 1086(420)  | 31.7 | 95  | 17.8 | 8.2  |
| 15[c] | 1534(420)  | 38.2 | 127 | 15.6 | 7.7  |
| 20[c] | 568(400)   | 28.5 | 110 | 15.2 | 12.0 |
| 25[c] | 621(380)   | 28.0 | 126 | 11.3 | 13.3 |
| 15[d] | 1533(420)  | 43.3 | 127 | 7.9  | 7.8  |
| 15[e] | 2008(420)  | 49.6 | 160 | 6.1  | 6.2  |
| 13[f] | 1558(440)  | 51.7 | 146 | 8.1  | 5.9  |
| 3 wt % ref. | 854(430) | 58.7 | 68 | 29.6 | 2.9 |

[a]Calculated by Scherrer's equation (using the at peak angle 2θ = 25.3°),
[b]Surface density of vanadium atoms calculated as $n_s = m_{V2O5} \cdot 2 \cdot N_A \cdot (m_{cat} \cdot M_{V2O5} \cdot S_{BET} \cdot 10^{18})^{-1}$,
[c]Synthesized using the NH$_4$Cl template without sulfation [16],
[d]Synthesized using the NH$_4$NO$_3$ template without sulfation,
[e]Synthesized using the NH$_4$NO$_3$ template followed by sulfation with sulfuric acid,
[f]Synthesized using the NH$_4$NO$_3$ template followed by sulfation with sulfuric acid and impregnation with 15 wt % WO$_3$.

In another embodiment of the invention the crystallization seed precursor is selected from ammonium acetate, ammonium propanoate, ammonium chloride, ammonium bromide, ammonium carbonate, ammonium hydrogen carbonate, ammonium carbamate, ammonium sulfamate, ammonium nitrate or ammonium sulfate, or mixtures thereof.

In a specific embodiment of the invention the crystallization seed precursor is selected from ammonium chloride, ammonium bromide, ammonium acetate, ammonium nitrate, ammonium carbonate, ammonium carbamate, ammonium sulfamate or ammonium sulfate.

In a further embodiment the carrier metal is selected from titanium, zirconium, cerium, tungsten, silicon and aluminum, or mixtures thereof.

In a specific embodiment the carrier metal is titanium. In another embodiment the carrier metal is zirconium. In a further embodiment the carrier metal is cerium. In a different embodiment the carrier metal is tungsten. In a still further embodiment the carrier metal is silicon. In another embodiment the carrier metal is aluminum.

In a further embodiment the catalyst metal oxide is vanadium oxide, iron oxide or copper oxide which is precipitated on the carrier metal oxide in an amount of up to 20% by weight of the finished catalyst nanoparticle.

In another embodiment the catalyst metal oxide is precipitated on the carrier metal oxide substantially as a monolayer.

In one embodiment the carrier metal oxide precursor is an alkoxide, such as an ethoxide, isopropoxide and n-butoxide.

In another embodiment the carrier metal oxide precursor is a C$_1$-C$_4$ carboxylate, such as acetate, propanoate or acetylacetonate.

In a specific embodiment the carrier metal oxide precursor is titanium(IV) isopropoxide.

In another embodiment the catalytically active material is an oxide of a metal selected from vanadium, iron, copper, platinum, palladium, chromium and manganese, or mixtures thereof.

In a specific embodiment of the invention the catalytically active material is an oxide of vanadium. In another embodiment the catalytically active material is an oxide of iron. In a further embodiment the catalytically active material is an oxide of copper. In a different embodiment the catalytically active material is an oxide of chromium. In a still further embodiment the catalytically active material is an oxide of manganese. In another embodiment the catalytically active material is an oxide of platinum. In a further embodiment the catalytically active material is an oxide of palladium.

In a specific embodiment the carrier metal is selected from titanium, zirconium, cerium, tungsten, silicon and aluminum, or mixtures thereof, and the catalytically active material is an oxide of a metal selected from vanadium, iron, copper, platinum, palladium, chromium, manganese or molybdenum, or mixtures thereof.

In a further embodiment the catalyst precursor is an alkoxide, such as an ethoxide, isopropoxide and n-butoxide.

In a further embodiment the catalyst precursor is a C$_1$-C$_4$ carboxylate, such as acetate, propanoate or acetylacetonate.

In a specific embodiment the catalyst precursor is vanadium (V) oxytriethoxide.

Another aspect of the invention concerns nanoparticular metal oxide catalysts, which catalysts comprise a carrier metal oxide comprising a catalytically active surface, obtainable by a process as described in the second aspect of the present invention.

In a specific embodiment the nanoparticular metal oxide catalyst is characterized by having a catalyst metal oxide content of up to 20 wt % V$_2$O$_5$.

In another embodiment the nanoparticular metal oxide catalyst is characterized by having a mean particle size between 6 and 16 nm. In yet another embodiment the nanoparticular metal oxide catalyst is characterized by having an active surface area/BET surface area of between 64 and 250 m$^2$/g. In yet another embodiment the nanoparticular metal oxide catalyst is characterized by having an active surface area/BET surface area of between 130 and 250 m$^2$/g. In yet another embodiment the nanoparticular metal oxide catalyst is characterized by having an active surface area/BET surface area of between 130 and 219 m$^2$/g.

Each of the embodiments mentioned herein and the use thereof may be claimed individually. In addition, it should be understood that various aspects, embodiments, implementations or features of the invention can be used separately or in any combination. For example, in a specific embodiment of the invention, the nanoparticular metal oxide catalyst contains an anatase titanium dioxide carrier with a catalytically active surface comprising a material selected from the oxides of vanadium, iron, copper, platinum, palladium, chromium and manganese, or mixtures thereof, such as vanadia (V$_2$O$_5$).

Another aspect of the invention relates to a process for the manufacture of C$_1$-C$_6$ carboxylic acids, aldehydes or ketones or mixtures thereof from 1 to 75 wt % aqueous alcohol solutions which process comprises using a catalyst of the invention at pressures from 1 to 20 bars and at temperatures of 100 to 250° C. with an amount of oxidizing agent corresponding to an O$_2$/alcohol molar ratio of between 0.5 to 10.

This aspect of the invention can be demonstrated for ethanol. The ethanol conversion and the selectivity towards acetaldehyde and acetic acid products was measured as a function of reaction temperature for a series of experiments performed with an O$_2$/ethanol mole ratio of 3.3, as depicted in FIG. 3. The conversion increased with increasing temperature (as expected), reaching nearly full conversion (>99%) at 200° C. Moreover, the selectivity changed significantly with temperature allowing acetaldehyde to be formed at a yield above 80% at 175° C. along with only a small amount of acetic acid and traces (≤1%) of carbon dioxide. At higher temperatures the selectivity towards acetic acid increased reaching a selectivity of 55% at 215° C., clearly signifying the importance of the reaction temperature on product formation.

In FIG. 4 the conversion of ethanol and the selectivity towards acetaldehyde and acetic acid are shown at the four space velocities examined (GHSV=2500, 12500, 25000 and 50000 h−1). When the residence time was increased (i.e. GHSV decreased) the reaction shifted towards formation of acid while acetaldehyde predominantly formed at short residence times, as expected if the acid is formed via the aldehyde. Notable, the conversion of ethanol remained close to 100% at all examined GHSV's and acetic acid was produced preferentially at lower temperatures and low space velocity, though the amount of acetic acid produced per gram of catalyst per hour (i.e. synthesis rate) of course was smaller at low space velocity. The synthesis rate of acetic acid was, for example, 0.89 g/(g cat h) at 215° C. with GHSV=25000 $h^{-1}$ and only 0.48 g/(g cat h) at 200° C. at a space velocity of 12500 $h^{-1}$. A maximum selectivity of 99% acetic acid with respect to acetyl products (81% based on ethanol conversion) was reached at full ethanol conversion when the reaction was performed at GHSV=2500 $h^{-1}$ and 200° C. Additionally, the selectivity and conversion changed only slightly when the temperature was reduced to 175° C., and even at a temperature as low as 165° C. the selectivity towards acetic acid remained above 80% (73% based on ethanol) with the conversion close to being quantitative (99%).

When reactions were conducted at different reaction pressures a significant change in the product composition was observed while conversion remained near 100% at all pressures, as shown in FIG. 5. Hence, a gradual decrease in the selectivity toward acetaldehyde from 60 to 25% occurred when the reaction pressure was changed from 2.0 to 10 bar, while the selectivity towards acetic acid remained essentially constant at 20%. The products accounting for the loss in acetyl selectivity was most likely mainly $CO_2$ formed by full oxidation and a minor amount of acetone.

Examination of the effect of the oxygen-to-ethanol molar ratio on the reaction using the three $O_2$/ethanol molar ratios of 3.3, 1.0 and 0.5 at 2.7 bars and GHSV=25000 $h^{-1}$, clearly revealed a correlation between the conversions reached at analogous temperatures and the oxygen content of the feed, as shown in FIGS. 3 and 6 Thus, for the $O_2$/ethanol molar ratios of 0.5, 1.0 and 3.3, respectively, the conversion was 37, 59 and 83% at 175° C. and 91, 95 and >99% at 200° C., respectively. In contrast, the reaction selectivity towards acetaldehyde remained high at all temperatures (>90%) for the lower $O_2$/ethanol molar ratios, while at excess oxygen, i.e. with a ratio of 3.3, acetic acid was predominantly formed. Importantly, no significant amount of combustion products were detected at all temperatures for either of the lower $O_2$/ethanol molar ratios examined.

It has thus been demonstrated how reaction conditions can be optimized in gas-phase oxidation of 50 wt % aqueous ethanol with dioxygen using a catalyst of the invention based on nano-sized anatase support to produce either acetaldehyde or acetic acid at high selectivities and near full conversion. Acetaldehyde was the prevailing reaction product in oxidations performed at 175-200° C., 2.7 bar and at space velocities above 25000 $h^{-1}$ reaching yields above 90%. In contrast, acetic acid was the predominant reaction product at low space velocity where selectivity above 80%, even at temperatures as low as 165° C., could be reached.

Another aspect of the invention relates to the use of a nanoparticular metal oxide catalyst of the invention as selective catalytic reduction (SCR) $deNO_x$ catalysts for environmental processes involving elimination of nitrogen oxides (such as $N_2O$, $NO$, $NO_2$) by use of a reductant ($C_1$-$C_6$ alkanes, $C_1$-$C_6$ alkenes, $C_1$-$C_6$ alcohols, ammonia or ammonia derivates such as e.g. urea).

The prepared catalysts of the invention showed remarkable SCR activity, as evident in the plot of the measured rate constants k vs. temperature in FIG. 7 (catalysts synthesized using $NH_4Cl$ template without added sulfuric acid).

The optimum vanadium loading was observed at 15 wt % vanadia where an activity was reached that to our knowledge is the highest activity so far reported in the literature at normal SCR reaction conditions. From FIG. 7 it is also clear that the temperature of maximum activity was gradually shifted from higher temperatures (around 480° C.) to lower temperatures (around 380° C.) with increasing vanadium loading. Since the maximum activity is reached where the competitive oxidation of $NH_3$ becomes more pronounced, the $NH_3$ to NO conversion must increase with increasing vanadium content.

Changing the template to $NH_4NO_3$ and adding sulfuric acid before drying and calcination increased the activity even further, see FIG. 8, allowing a rate constant above 2000 $cm^3g^{-1}s^{-1}$ to be obtained. However, the thermal stability also decreased due to decomposition of sulfate species on the surface, starting from 380° C. Adding tungsten by incipient wetness impregnation increased the thermal stability and virtually no temperature hysteresis of the activity was observed, except an increase in activity at lower temperatures due to activation of the catalyst. However, the overall activity was lowered by impregnation. Comparing with a state of the art commercial catalyst all three examined nanoparticle catalysts performed much better and an activity up to three times the commercial catalyst was observed.

Another aspect of the invention relates to the use of a nanoparticular metal oxide catalyst of the invention as catalysts for the photocatalytic degradation of volatile organic compounds (VOC's) such as, but not limited to, phenol, toluene, xylenes, n-hexane, formaldehyde, methanol, ethanol, isopropanol, acetone, methyl ethyl ketone, chloroform, trichloroethylene and mixtures thereof.

Another aspect of the invention relates to a process for removing nitrogen oxides in the presence of ammonia from flue gases or other industrial off-gases, which process comprises using a catalyst of the invention at ambient pressure from 100° C. to about 500° C. with 1-20% $O_2$, 0-20% $H_2O$ with a stoichiometric or excess amount of the reductant.

Another embodiment of the invention concerns the process of selectively removing nitrogen oxides with ammonia from gases resulting from the burning of biomass, combined biomass-fossil fuel or emerging from waste incineration units at a temperature from about 150° C. to about 550° C.

This aspect of the invention was demonstrated by investigating the resistance to potassium poisoning of the catalysts of the invention, which showed a pronounced advantage of the nanoparticle catalysts as clearly shown in FIG. 9. The four catalysts were impregnated with 0.01 g potassium pr. gram of catalyst. From the following activity measurements it was evident that the commercial catalyst performed worst by deactivating 70% at the new activity maximum. At normal SCR operation temperature (380° C.) the deactivation was even worse. The non-sulfated catalyst suffered also a high deactivation of 60% but maintained a relatively high activity at 380° C. Upon sulfation the resistance increased even more and the catalyst only deactivated 25% and the tungstenated sample deactivated 32%. All the catalysts revealed increased deactivation upon heating due to surface diffusion of potassium to the active sites above the $K_2O$ Tamman temperature.

Furthermore, decomposition of formed sulfate-potassium species leads to liberation of potassium oxide as previously reported with sulfated catalysts [Kustov at al., Appl. Catal. B 58 (2005) 97]. The tungstated catalysts showed much lower thermal deactivation due to the earlier described stabilization of the sulfate surface species.

The pore size distributions of the materials was calculated from nitrogen physisorption isotherms to be relatively well defined with pore diameters in the range 3-5 nm, increasing with the vanadium loading. Representative size distribution plots are shown for the 3 wt % and 20 wt % materials in FIG. 10.

For the material with 20 wt % vanadia loading a shoulder appeared, however, at 8-9 nm suggesting a slightly bimodal pore structure for the catalysts with high loadings of vanadium. For comparison the pore size distribution of a conventional $TiO_2$ sample exposed to similar thermal treatment is also shown in FIG. 10 An obvious shift in pore size distribution towards smaller pores is obtained by the new seed-assisted sol-gel method. Thus, the new materials have a pore structure which can be characterized as being between micro- and meso-pores. Microporosity as such is not desirable for catalyst materials, due to possible diffusion limitations to the less accessible surface.

The observed increase of pore sizes combined with the increased areas are not observed for vanadia/$TiO_2$ materials synthesized by conventional impregnation methods. Here a decrease is usually observed along with the filling of the pore system [Yates et al. (2005) Catal. Today 107-108, 120]. The phenomenon observed here can be explained by the induced added distance between the anatase particles by the vanadium salt during the co-precipitation step. After calcination the precursor transforms to mobile oxo-vanadium species which disperse over the high surface area of $TiO_2$, leaving the framework with increased porosity, wider pores and added surface roughness.

Commonly, for low temperature applications, such as placement of the catalyst unit in the flue gas duct after dust filtration in waste incineration plants, the temperature of the flue gas is in the range of 150-300° C. In the case of high temperature applications, such as placement of the catalyst unit at high duct positions in the flue gas duct, the temperature of the flue gas is often in the range of 340-420° C. For intermediate temperature applications, the temperature of the flue gas is in the area of about 250-370° C.

Commonly, one or more heat exchange units are provided in order to utilize the thermal energy of the flue gas. In one embodiment, the SCR process according to the invention takes place before a heat exchange unit. In a further embodiment, the SCR process is conducted after a heat exchange unit. In yet another embodiment, the SCR process takes place in between heat exchange units. In still another embodiment, heat controlling means are provided in order to control the temperature of the flue gas before and/or during the SCR. Thereby the efficiency of the SCR process can be controlled and/or optimized for the respective catalyst according to the invention, and its temperature profile with respect to catalytic activity. Such heat controlling means may comprise means to alter the rate of combustion, means to alter the flow of gas and the like. Generally, such means are well-known in the art.

Very often, fuels containing alkali metals as well as earth alkali metals will also generate significant amounts of alkali metals as well as earth alkali metals in the resulting flue gases upon incineration or burning. Fossil fuels, such as oil, natural gas and coal contain lower amounts of alkali metals and earth alkali metals. Waste, such as waste burned in waste incineration plants contains high levels of alkali metals as well as earth alkali metals. Biomass or biomass fuel such as straw, woodchips and wood pellets contain very high levels of alkali metals, especially potassium, as well as earth alkali metals. In the case of fly ash from burning straw, alkali metals and earth alkali metals can comprise as much as half of the total weight of the fly ash.

The activity of industrial $V_2O_5/TiO_2$-based SCR catalysts is limited by the surface area and acidity of the anatase carrier. Since only up to one monolayer of the vanadium oxide species, which has a theoretical maximum of 7-8 Vanadium atoms pr $nm^2$ [Busca et al., Langmuir 5 (1986) 568; Bond et al., Appl. Catal. 71 (1991) 1], shows high activity and selectivity, commercial catalysts can accommodate a vanadia loading of 3-5 wt %. Exceeding the monolayer capacity of the carrier with a high vanadia loading leads to formation of crystalline $V_2O_5$, which exhibit decreased $deNO_X$ activity and increased ability to oxidize $NH_3$ and possibly also $SO_2$ in the flue gas [Busca et al., Appl. Catal. 18 (1998) 1]. A further advantage of a catalyst and its use according to the current invention, is that due to the higher catalyst loading possible as compared with conventional catalysts, the volume or amount of catalyst can be reduced if desired, compared to conventional catalysts, thus e.g. providing a reduction in pressure drop/resistance in the gas flow, a feature that is often desired.

By the use of a catalyst according to the invention, the lifetime can therefore be increased significantly compared to conventional catalysts. In one embodiment of the invention, the life time of the catalyst is increased by a factor of at least 1.5; 1.5-3.0; 3.0-5.0; 5.0-10; or 100, compared to a similar/comparable catalyst having a conventional, non-nanoparticular particle size.

In a further embodiment of the invention, the lifetime of the catalyst according to the invention is 2-5 times compared to a comparable catalyst with conventional, non-nanoparticular particle size. Apart from economical benefits, this also provides a greater flexibility with respect to preventive maintenance of the application or plant employing the catalyst, exchange and/or cleaning of the catalyst. By a larger window of opportunity for when to close the plant for exchange, cleaning, or reactivation of the catalyst, sensitive time periods may be avoided. For many applications, a shut down during summer is less expensive than during winter.

These embodiments of the invention were demonstrated by the activity of the wt % $V_2O_5/SO_4^{2-}$—$TiO_2$ catalyst prepared according to the present invention which had a maximum around the rate constant k=2000 $cm^3 s^{-1} g^{-1}$, which is almost three times higher than the commercial state-of-the-art catalyst used as reference. Impregnation with $WO_3$ decreased catalytic activity and acidity, but increased thermal stability. The catalysts of the present invention also showed increased resistance toward potassium poisoning. Thus the deactivation by potassium poisoning of the commercial catalyst was 70% compared to only 25% and 32% for the 15 wt % $V_2O_5/SO_4^{2-}$—$TiO_2$ and 15 wt % $V_2O_5$-15 wt % $WO_3/SO_4^{2-}$—$TiO_2$, respectively, meaning that the new catalysts maintained a five times higher activity than the commercial at 380° C. after poisoning.

A still further advantage of a catalyst and its use according to the current invention is where small catalyst bed volumes or SCR catalysts with prolonged life on steam are desired. This is especially the case for biomass-fired power plants (or co-fired with fossil fuels), where the aggressive potassium-containing flue-gas rapidly decreases the activity of the traditional deNOx catalysts.

A catalyst according to the present invention can be treated and handled using conventional methods and techniques in the field. The catalyst can also be cleaned/washed and recycled. The catalyst according to the present invention also displays very convincing long term stability under realistic operating SCR deNOx conditions as witnessed by FIG. 11: 3.1 mg catalyst (15 wt % $V_2O_5/SO_4^{2-}$—$TiO_2$) was subjected during three weeks to a constant flow (400 ml/min) of a gas mixture containing 1015 ppm $NH_3$, 935 ppm NO and 3.4% $O_2$ (He carrier gas) at 380° C. without losing significant activity. After an initial very small decrease, the activity of the catalyst was approximately constant when measured over the following three weeks, which indicates that the catalysts of the invention do not agglomerate under SCR deNOx conditions.

The present invention will be better understood after reading the following non-limiting examples.

EXPERIMENTAL

X-ray powder diffraction patterns (XRPD) of the prepared materials were recorded using Cu—Kα radiation (λ=1.54056 nm) in the 2θ interval 5-100° with a Huber G670 Guinier camera.

Transmission electron microscopy (TEM) was performed on a JEM 2000FX apparatus with an accelerating voltage of 300 kV. A suspension of about 2 mg of the powdered samples in 2 mL ethanol was sonicated for 1 h and allowed to settle for 15 min, before a drop was distributed on a 300 mesh copper grid coated with a carbon film with holes.

Nitrogen sorption data were obtained at liquid nitrogen temperature by using a Micromeritics ASAP 2020 apparatus. Before determination of nitrogen adsorption-desorption isotherms the samples (ca. 0.4 g) were outgassed for 2 h at 200° C. under vacuum. The apparent specific surface areas ($S_{BET}$) were evaluated by two-parameter linear BET plots in the range $p/p_0$=0.065-0.2. The external areas ($S_{ext}$) were determined with the t-plot method [Lippens B C et al. (1965) J. Catal. 4, 319]. Due to perculation effects on the desorption branches [Groen J C et al. (2004) Appl. Catal. A 268, 121] mesopore size distributions were obtained using data from the adsorption branches by assuming open nonintersecting cylindrical pores [Mellqvist J et al. (1996) Quant. Spectrosc. Radiat. Transfer 56, 87]. The thickness of the adsorbed layer at each relative pressure was obtained from the classical equation of Harkins and Jura [Rouquerol F et al. (1999) Adsorption by Powders and Porous Solids—Principles, Methodology and Applications. Academic Press, London].

EXAMPLE 1

Sulfated Catalyst

Preparation of 15 wt % $V_2O_5/SO_4^{2-}$—$TiO_2$ Catalyst

A solution of 3.10 g $NH_4NO_3$ (38.7 mmol) in 4.40 g deionized water was added dropwise to a stirred, ice-cooled solution containing 4.000 g $Ti(i-PrO)_4$ (14.1 mmol), 0.432 g $VO(EtO)_3$ (2.1 mmol), 1.90 g glacial acetic acid (31.6 mmol) and 20.0 g ethanol. The resulting solution was then allowed to gelatinize during aging for 48 hours with stirring; whereafter 0.15 ml of 96 wt % sulphuric acid was added. After additionally 5 hours of stirring the solvent was evaporated in vacuo (70° C., 1 mbar, 1 hour). The evaporation residue was calcined at 380° C. for 4 hours to afford the final catalyst material.

EXAMPLE 2

Non-Sulfated Catalyst

Preparation of 15 wt % $V_2O_5/TiO_2$ Catalyst

A solution of 2.90 g $NH_4Cl$ (54.2 mmol) in 6.16 g deionized water was added dropwise to a stirred, ice-cooled solution containing 5.60 g $Ti(i-PrO)_4$ (19.7 mmol), 0.603 g $VO(EtO)_3$ (2.94 mmol), 2.66 g glacial acetic acid (44.1 mmol) and 28.0 g ethanol. The resulting solution was then allowed to form a gel during aging for 48 hours with stirring. The solvent was evaporated at reduced pressure (50° C., 20 mbar, 1 hour). The sample was outgassed in vacuum (<1 mbar) for 100 hours at 50° C. in order to remove remains of acetic acid. The evaporation residue was calcined at 380° C. for 4 hours to afford the final catalyst material.

EXAMPLE 3

Sulfated Catalyst

Preparation of 4% wt. $CuO/SO_4^{2-}$—$TiO_2$

A solution of 1.40 g $NH_4Cl$ (26.2 mmol) in 4 mL deionized water was added dropwise to a stirred, ice-cooled solution of 3.70 g $Ti(i-PrO)_4$ (13.0 mmol), 0.107 g g copper(II) acetate monohydrate (0.49 mmol), and 2.43 g glacial acetic acid (40.5 mmol) in 10 mL abs. ethanol. After addition of the aqueous solution, a yellowish gel was formed, which subsequently was aged 20 h under stirring. 5 drops of concentrated $H_2SO_4$ was added, before ethanol, liberated propanol, acetic acid, and excess water were removed under reduced pressure (0.2 mbar, 70-100° C.). Finally, the material was calcined (400° C., 6 h) in an air stream (300 mL

EXAMPLE 4

Catalytic Gas-Phase Oxidations

Methodology

Oxidation reactions were conducted in an all-heated stainless steel continuous, fixed-bed flow system using 200 mg of fractionized (180-300 μm) catalyst diluted with 800 mg of calcined silica (silica gel 100, Merck, 400° C., 3 h) and 50 wt % ethanol solution (prepared with 99.99% ethanol, Aldrich) as feedstock. The liquid was continuously evaporated and mixed with oxygen (10% $O_2$ in He, Strandmoellen Lab) in a Controlled Evaporator Mixer (Hi-Tec CEM unit, Bronkhorst) heated to 180° C. The reaction pressure was kept constant during the experiments by a regulation loop consisting of a pneumatic back-pressure regulator valve (Microvalve 3510, Samson), an electronic controller (Travis 6493) and a pressure transducer (Wika S-11). The reaction temperature was measured inside the reactor (±0.1° C.) by an internally positioned thermocouple (Inconel® 600, Omega) placed in the catalyst bed. During the catalytic runs gas samples (1.0 ml) were analyzed periodically every 16 min by an integrated on-line FID-GC (Perkin Elmer Autosystem XL, Nukol capillary column, 15 m×0.53 mm ID, Supelco Inc.) using auto gas sampling until steady state was reached. The FID-GC analysis allowed determination of ethanol conversion and selectivity to acetyl products by comparison to reference samples. The amount of carbon dioxide formed was determined from the molar balance, but was only significant (i.e. ≥2%) at the highest pressures and temperatures examined.

Several reaction parameters were investigated independently by keeping all other parameters constant, including gas hourly space velocity (GHSV=2500-50000 $h^{-1}$), temperature (165-215° C.), total pressure (2-10 bars) and $O_2$/ethanol molar feed ratio (0.5-3.3).

Initial reaction conditions (i.e. standard conditions) were adjusted to a total gas flow of 100 ml/min of 10% $O_2$ in helium and a liquid flow of 0.684 g/h of 50 wt % aqueous ethanol (i.e. ethanol/water molar ratio of 0.39), corresponding to an $O_2$/ethanol molar ratio of 3.3 and a GHSV of 25000 $h^{-1}$. The reaction temperature was set to 200° C. and the total pressure to 2.7 bar, which resulted in full conversion of the ethanol. At standard conditions a control experiment with pure silica (1.0 g) allowed to exclude the effect of the dilutant (up to 10% conversion with 96% selectivity towards acetaldehyde) on the catalyst performance.

Results

Reaction conditions could be optimized in the gas-phase oxidation of 50 wt % aqueous ethanol with dioxygen using catalysts of the present invention to produce either acetaldehyde or acetic acid at high selectivities and near full conversion. Acetaldehyde was the prevailing reaction product in oxidations performed at 175-200° C., 2.7 bar and at space velocities above 25000 $h^{-1}$ reaching yields above 90%. In contrast, acetic acid was the predominant reaction product at low space velocity where selectivities above 80%, even at temperatures as low as 165° C., could be reached.

EXAMPLE 5

Selective Catalytic Reduction (SCR) of Nitrogen Oxides (deNOx Reactions)

Methodology

SCR of nitric oxide were performed in a continuous-flow setup equipped with a fixed-bed quartz reactor loaded with about 50 mg fractionized (180-295 μm) catalyst samples containing 2-10 mg of active metal oxide/support catalyst diluted with calcined silica (silica gel 100, Merck, 180-295 μm, 500° C., 15 h). Catalytic tests were performed with a total flow of 145-320 mL $min^{-1}$ (GHSV≈4.000.000 $h^{-1}$) of reactant gas containing 1000 ppm NO, 1100 ppm $NH_3$ and 3.5% $O_2$ (balanced with He) obtained from mixing of 1% NO/He (±0.1% abs.), 1% $NH_3$/He (0.05% abs.), $O_2$ (≥99.95%) and He (≥99.999%) (all from Strandmøllen, Denmark).

Catalyst performance, expressed as the apparent first-order rate constant k ($k=-F_0 \cdot [NO]_0^{-1} \cdot m_{cat}^{-1} \cdot \ln(1-X)$, where $[NO]_0$ is the initial molar gas flow, $[NO]_0$ is the initial NO concentration, $m_{cat}$ is the mass of active catalyst, and X is the conversion ratio) was obtained from measurements of steady-state gas outlet concentrations of NO at conversions ≤80% by UV-VIS spectrophotometry (Perkin Elmer Lambda 11/BIO spectrometer, 10 cm gas cell) using the characteristic NO absorption band at λ=226 nm.

Results

Catalysts of the present invention could be optimized in performance for the SCR deNOx reaction compared to an industrial reference 3 wt % $V_2O_5$-7 wt % $WO_3$/$TiO_2$ catalyst by varying the catalyst composition with respect to metal content, metal loading and support material, as shown in Table 3. A maximum apparent first-order rate constant, $k_{max}$, above 2000 $cm^3$ $g^{-1}$ $s^{-1}$ could be obtained in the temperature range 420-430° C., while analogous k-values up to 1700 $cm^3$ $g^{-1}$ $s^{-1}$ could be reached at a common SCR deNOx reaction temperature of 380° C.

TABLE 3

Performance of SCR deNOx catalyst

| Entry | Catalyst | $k_{max}$ [$cm^3 \cdot g^{-1} \cdot s^{-1}$] | T at $k_{max}$ [° C.] | k at 380° C. [$cm^3 \cdot g^{-1} \cdot s^{-1}$] | Particle size [nm] |
|---|---|---|---|---|---|
| 1 | 4 wt % CuO/$SO_4^{2-}$—$TiO_2$ | 1389 | 400 | 1129 | 5.6 |
| 2 | 3 wt % $Fe_2O_3$/$SO_4^{2-}$—$TiO_2$ | 1015 | 445 | 520 | 5.2 |
| 3 | 15 wt % $V_2O_5$/$SO_4^{2-}$—$TiO_2$ | 2009 | 421 | 1537 | 6.1 |
| 4 | 13% $V_2O_5$—15% $WO_3$/$SO_4^{2-}$—$TiO_2$ | 1558 | 440 | 1420 | 8.1 |
| 5 | Industrial reference catalyst | 828 | 413 | 783 | 25 |

| Entry | Catalyst | $k_{max}$ [$cm^3 \cdot g^{-1} \cdot s^{-1}$] | T at $k_{max}$ [° C.] | k at 380° C. [$cm^3 \cdot g^{-1} \cdot s^{-1}$] | Particle size [nm] | $S_{BET}$ ($m^2$/g) |
|---|---|---|---|---|---|---|
| 1 | 15 wt % $V_2O_5$/$SO_4^{2-}$—$TiO_2$ | 2009 | 421 | 1537 | 6.1 | 160 |
| 2 | 15 wt % $V_2O_5$/$TiO_2$ | 1495 | 420 | 1376 | 14.1 | 127 |
| 3 | 4 wt % CuO/$SO_4^{2-}$—$TiO_2$ | 1389 | 400 | 1129 | 5.6 | 219 |
| 4 | 3 wt % $Fe_2O_3$/$SO_4^{2-}$—$TiO_2$ | 1015 | 445 | 520 | 5.2 | 177 |
| 5 | 13% $V_2O_5$—15% $WO_3$/$SO_4^{2-}$—$TiO_2$ | 1558 | 440 | 1420 | 8.1 | 158 |
| 6 | Industrial reference catalyst | 828 | 413 | 783 | 25 | 68 |

EXAMPLE 6

Potassium Resistance

The remarkably high resistance of the nano catalysts of the present invention towards poisoning with alkaline metals in deNOx reactions was demonstrated with incipient wetness impregnation with a $KNO_3$ solution equal to 1 wt % Potassium of the catalyst. The commercial reference suffered a decrease in activity of 70%, whereas the $KNO_3$ impregnated nano catalysts of the present invention (15 wt % $V_2O_5$/$SO_4^{2-}$—$TiO_2$, 4 wt % CuO/$SO_4^{2-}$—$TiO_2$ and 13% $V_2O_5$-15% $WO_3$/$SO_4^{2-}$—$TiO_2$) only suffered a decrease in activity of 25-30%.

EXAMPLE 7

Characterization of the Active Metal Oxide Phase Using FT-IR 1 mg of the catalyst samples containing 0-20 wt % $V_2O_5$/$TiO_2$ was mixed with 100 mg dried KBr, pressed into pellets and analysed with a Perkin-Elmer 1710 Infrared Fourier Transform Spectrophotometer. The sharp and intense band at 1020 $cm^{-1}$ from the V=O stretch observed for crystalline $V_2O_5$, undergoes a shift to 980 $cm^{-1}$ when the $V_2O_5$ phase is present as an amorphous monolayer phase attached to a metal oxide surface. None of the analysed samples showed absorption of light at 1020 $cm^{-1}$, whereas all samples above 3% wt $V_2O_5$ showed a shoulder around 980 $cm^{-1}$. This method is much more reliable to exclude the presence of crystalline $V_2O_5$ compared to X-ray diffraction which is not able to detect very small $V_2O_5$ crystallites.

The invention claimed is:

1. A method of preparing nanoparticular vanadium oxide/anatase titania catalysts having a BET surface area of 130-219 $m^2/g$, an average particle size of 6 nm±2 nm, and comprising an anatase titania carrier and a catalytically active vanadium oxide component, comprising:
    (a) providing a solution of an ammonium salt in a first solvent;
    (b) providing a solution of one or more hydrolysable titania precursors and one or more hydrolysable vanadium catalyst precursors in a second solvent;
    (c) combining the solutions of (a) and (b) under acidic, aqueous conditions, thereby hydrolyzing said titania and vanadium catalyst precursors;
    (d) aging the reaction mixture of (c) for between 4 and 48 hours, thereby allowing the hydrolytic processes to proceed substantially to completion, thereby providing nanoparticular titania catalyst precursors comprising crystallization seeds upon which the vanadium oxide is co-precipitated with the titania carrier;
    (e) adding 0.05-1 moles of sulfuric acid per mole titania precursor; and
    (f) removing solvents and volatile reaction components by evaporation in vacuo;
followed by calcining the nanoparticular titania catalyst precursors for between 2 and 8 hours at between 250° C. and 500° C.

2. The method according to claim 1, wherein the first solvent comprises water, and the second solvent is a polar, water miscible solvent.

3. The method according to claim 2, wherein the second solvent is selected from the group consisting of $C_1$-$C_4$ alcohols, cyclic ethers, dialkylketones, alkylnitriles, and mixtures thereof, optionally comprising water.

4. The method according to claim 2, wherein the second solvent is selected from the group consisting of tetrahydrofuran, 1,4-dioxane, acetone, methylethylketone, methylisobutylketone, acetonitrile, propionitrile, nitromethane, and mixtures thereof, optionally comprising water.

5. The method according to claim 1, wherein the ammonium salt is:

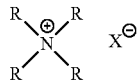

wherein each R group is individually selected from hydrogen, $C_1$-$C_{12}$ alkyl and phenyl-$C_1$-$C_6$ alkyl, such that all four R groups are identical or three R groups are identical or two R groups are identical or all four R groups are different; and
wherein $X^-$ is a negatively charged ion.

6. The method according to claim 5, wherein R is selected from the group consisting of alcohol-, ether-, ester-, amine-, amide-, cyano-, and halogen-functionalized alkyl chains.

7. The method according to claim 5, wherein $X^-$ is selected from the group consisting of $C_1$-$C_4$ carboxylates, halides, and oxyanions.

8. The method according to claim 5, wherein $X^-$ is selected from the group consisting of acetate, propanoate, chloride, bromide, carbonate, hydrogen carbonate, carbamate, sulfamate, nitrate and sulfate.

9. The method according to claim 5, wherein the ammonium salt is selected from the group consisting of ammonium chloride, ammonium bromide, ammonium nitrate, ammonium carbonate and ammonium sulfate.

10. The method according to claim 1, wherein the titania carrier further comprises an oxide of a metal selected from the group consisting of zirconium, cerium, tungsten, silicon and aluminum, and mixtures thereof.

11. The method according to claim 1, wherein the catalytically active vanadium oxide component further comprises an oxide of a metal selected from the group consisting of iron, copper, platinum, palladium, chromium, manganese and molybdenum, and mixtures thereof.

12. A nanoparticular vanadium oxide/anatase titania catalyst obtained by a method according to claim 1, the nanoparticular vanadium oxide/anatase titania catalyst comprising:
    an anatase titania carrier; and
    a catalytically active vanadium pentoxide component supported on the anatase titania carrier,
    wherein the nanoparticular vanadium oxide/anatase titania catalyst has a BET surface area of 130-219 $m^2/g$ and an average particle size of 6 nm±2 nm, and
    wherein a content of the catalytically active vanadium pentoxide supported on the anatase titania carrier is greater than or equal to 13% and less than or equal to 20%, by weight of the final catalyst.

13. A catalyst according to claim 12, wherein a content of the catalytically active vanadium pentoxide supported on the anatase titania carrier is selected from the group consisting of 13%, 15% and 20%, by weight of the final catalyst.

14. A catalyst according to claim 12, wherein a content of the catalytically active vanadium pentoxide supported on the anatase titania carrier is 15%, by weight of the final catalyst.

15. A process for eliminating nitrogen oxides from a gas containing nitrogen oxides, comprising contacting the gas with a nanoparticular metal oxide catalyst according to claim 12 in the presence of a reductant.

16. The process of claim 15, wherein the gas comprises power plant flue gasses or other off-gasses containing nitrogen oxides selected from one or more of $N_2O$, NO, and $NO_2$, and wherein the reductant is selected from the group consisting of ammonia and urea.

17. A process for removing nitrogen oxides from a flue gas or other industrial off-gas comprising nitrogen oxides, comprising contacting the gas with a catalyst according to claim 12 at ambient pressure and at temperatures of 100° C. to 500° C. in the presence of a stoichiometric or excess amount of a reductant selected from the group consisting of ammonia and urea.

* * * * *

UNITED STATES PATENT AND TRADEMARK OFFICE
CERTIFICATE OF CORRECTION

PATENT NO. : 8,969,238 B2  
APPLICATION NO. : 13/129522  
DATED : March 3, 2015  
INVENTOR(S) : Rasmus Fehrmann et al.

It is certified that error appears in the above-identified patent and that said Letters Patent is hereby corrected as shown below:

ON THE TITLE PAGE OF THE PATENT

In item (75) Inventors, please replace "Anders Riisager, Tanstrup (DK)" with -- Anders Riisager, Taastrup (DK) --.

Signed and Sealed this  
Twenty-fifth Day of August, 2015

Michelle K. Lee  
*Director of the United States Patent and Trademark Office*